United States Patent
Lin (10) Patent No.: US 8,159,571 B2
(45) Date of Patent: Apr. 17, 2012

(54) METHOD OF GENERATING HDR IMAGE AND DIGITAL IMAGE PICKUP DEVICE USING THE SAME

(75) Inventor: Chao-Chun Lin, Taiwan (TW)

(73) Assignee: MSI Computer(Shenzhen)Co., Ltd., Shenzhen, Guangdong Province (CN)

( * ) Notice: Subject to any disclaimer, the term of this patent is extended or adjusted under 35 U.S.C. 154(b) by 283 days.

(21) Appl. No.: 12/564,154

(22) Filed: Sep. 22, 2009

(65) Prior Publication Data
US 2010/0245635 A1    Sep. 30, 2010

(30) Foreign Application Priority Data

Mar. 25, 2009   (TW) ................................ 98109807 A (51) Int. Cl.
*H04N 5/202* (2006.01)
*H04N 17/00* (2006.01)
*H04N 17/02* (2006.01)
*G06K 9/00* (2006.01)

(52) U.S. Cl. ......... 348/254; 348/175; 348/180; 382/169

(58) Field of Classification Search .................. 348/254, 348/187–188, 175; 382/169
See application file for complete search history.

(56) References Cited

U.S. PATENT DOCUMENTS

| 2008/0226167 A1* | 9/2008 | Holt | 382/169 |
| 2009/0066819 A1* | 3/2009 | Ando | 348/254 |

* cited by examiner

*Primary Examiner* — Lin Ye
*Assistant Examiner* — Mekonnen Dagnew
(74) *Attorney, Agent, or Firm* — Morris Manning & Martin LLP; Tim Tingkang Xia, Esq.

(57) ABSTRACT

A method of generating a high dynamic range (HDR) image and a digital image pickup device using the same are described. The digital image pickup device is employed to generate an HDR image according to a single digital image. The method includes the steps of obtaining an original image; performing a gray-scale processing to convert the original image into an original gray-scale pattern, in which each pixel in the original gray-scale pattern is assigned with a gray-scale value; performing a conversion procedure according to a gradient and a compensation value of the gray-scale value of each pixel in the original gray-scale pattern, and generating a high dynamic gray-scale pattern by using the gradients and the compensation values; and compensating the original image with the high dynamic gray-scale pattern, so as to generate the HDR image.

6 Claims, 6 Drawing Sheets

METHOD OF GENERATING HDR IMAGE AND DIGITAL IMAGE PICKUP DEVICE USING THE SAME

CROSS-REFERENCE TO RELATED APPLICATIONS

This non-provisional application claims priority under 35 U.S.C. §119(a) on Patent Application No(s). 098109807 filed in Taiwan, R.O.C. on Mar. 25, 2009, the entire contents of which are hereby incorporated by reference.

BACKGROUND OF THE INVENTION

1. Field of Invention

The present invention relates to a digital image processing method and a device using the same, and more particularly to a method of generating a high dynamic range (HDR) image and a digital image pickup device using the same.

2. Related Art

Figure 1:
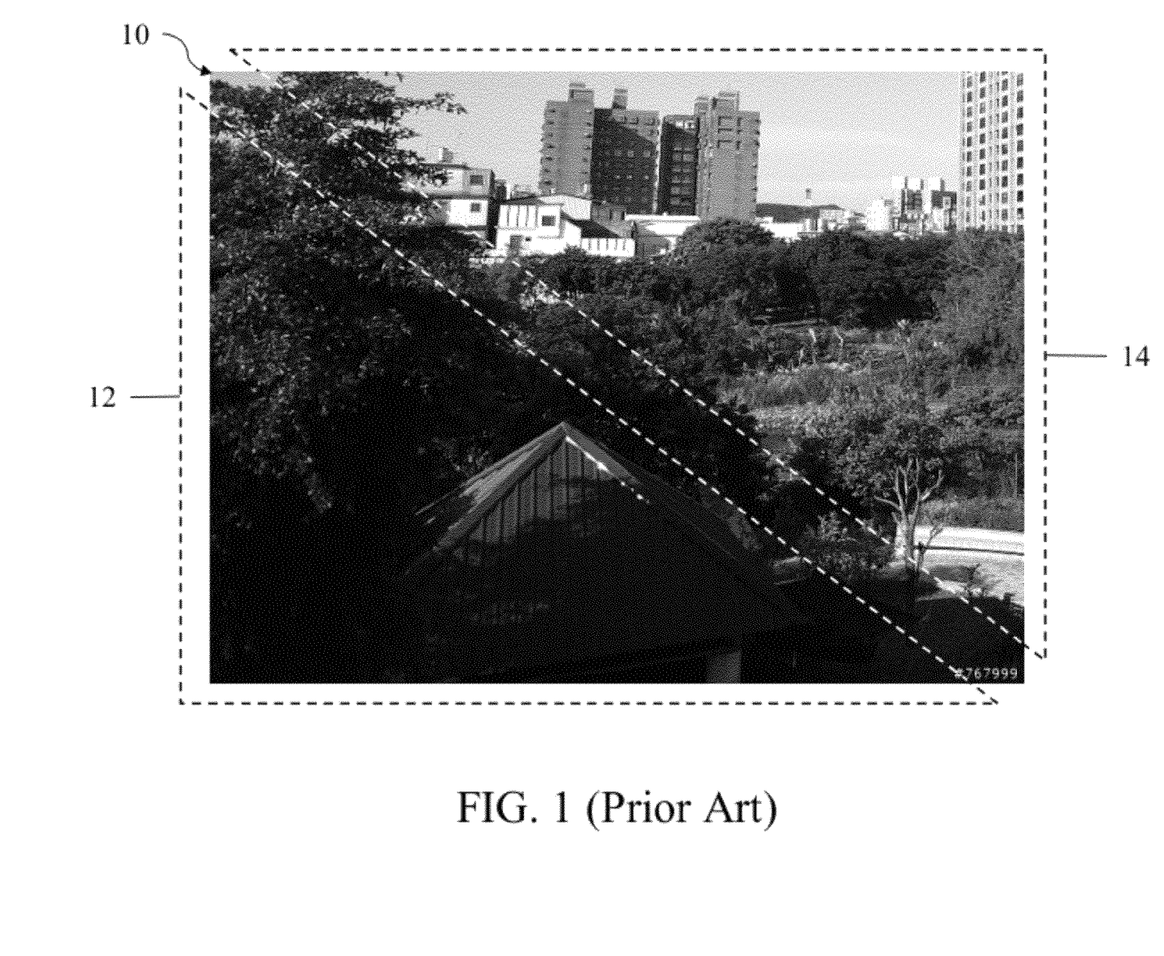
FIG. 1 is a schematic view of an image with an insufficient dynamic range.

When sensing the lights, the visual system of the human eye adjusts its sensitiveness according to the distribution of the ambient lights. Therefore, the human eye may be adapted to a too-bright or too-dark environment after a few minutes' adjustment. Currently, the working principles of the image pickup apparatus, such as video cameras, cameras, single-lens reflex cameras, and Web cameras, are similar, in which a captured image is projected via a lens to a sensing element based on the principle of pinhole imaging. However, the photo-sensitivity ranges of a photo-sensitive element such as a film, a charge coupled device sensor (CCD sensor), and a complementary metal-oxide semiconductor sensor (CMOS sensor) are different from that of the human eye, and cannot be automatically adjusted with the image. Therefore, the captured image usually has a part being too bright or too dark. FIG. 1 is a schematic view of an image with an insufficient dynamic range. The image 10 is an image with an insufficient dynamic range captured by an ordinary digital camera. In FIG. 1, an image block 12 at the bottom left corner is too dark, while an image block 14 at the top right corner is too bright. In such a case, the details of the trees and houses in the image block 12 at the bottom left corner cannot be clearly seen as this area is too dark.

Figure 2:
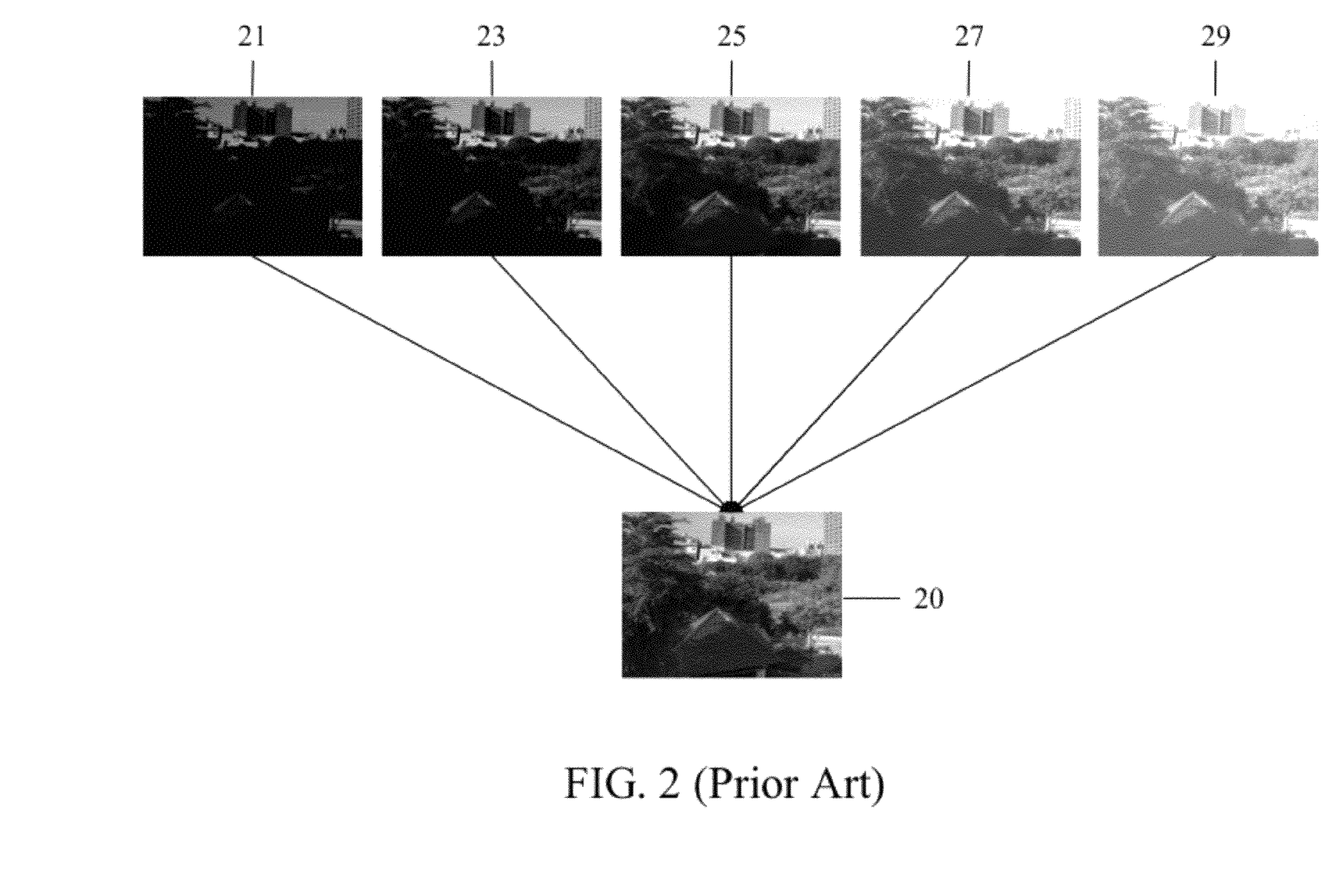
FIG. 2 is a schematic view of synthesizing a plurality of images into an HDR image.

In the prior art, in order to solve the above problem, a high dynamic range (HDR) image is adopted. The HDR image is formed by capturing images of the same area with different photo-sensitivities by using different exposure settings, and then synthesizing those captured images into an image comfortable to be seen by the human eye. FIG. 2 is a schematic view of synthesizing a plurality of images into an HDR image. The HDR image 20 is formed by synthesizing a plurality of images 21, 23, 25, 27, and 29 with different photo-sensitivities. This method achieves a good effect, but also has apparent disadvantages. First, the position of each captured image must be accurate, and any error may result in difficulties of the synthesis. Besides, when the images are captured, the required storage space rises from a single frame to a plurality of frames. Moreover, the time taken for the synthesis is also considered. Therefore, this method is time-consuming, wastes the storage space, and easily gets wrong.

Figure 3:
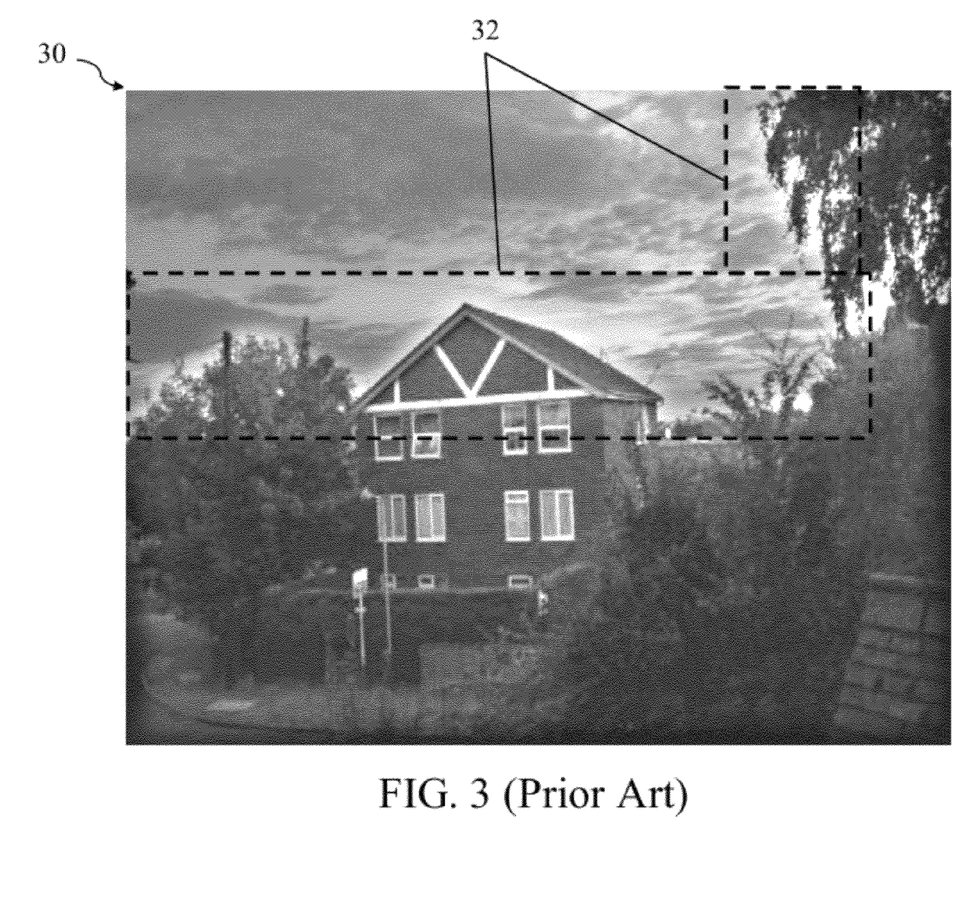
FIG. 3 is a schematic view of an image bloom.

Further, in the prior art, when an image processing is performed to simulate an HDR image, an image bloom is usually generated. FIG. 3 is a schematic view of an image bloom. When simulating the HDR image 30, the brightness of too-dark areas in the image is raised, and meanwhile the texture of the image should be maintained, so that the brighter parts in these too-dark areas are made even brighter, and thus the image texture effect may not be weakened due to the brightening of the too-dark areas. However, this method may also enhance the brightness at the borders 32 of the too-dark and too-bright areas, thus resulting in an image bloom.

SUMMARY OF THE INVENTION

In order to solve the above problems, the present invention is a method of generating a high dynamic range (HDR) image and a digital image pickup device using the same, in which a gray-scale processing and image compensation are performed on an original image to generate an HDR image.

In a preferred embodiment of the present invention, a method of generating HDR image is provided for generating an HDR image according to a single digital image. The method comprises: obtaining an original image; performing a gray-scale processing to convert the original image into an original gray-scale pattern, in which each pixel in the original gray-scale pattern is assigned with a gray-scale value; performing a conversion procedure according to a gradient and a compensation value of the gray-scale value of each pixel in the original gray-scale pattern, and generating a high dynamic gray-scale pattern by using the gradients and the compensation values; and compensating the original image with the high dynamic gray-scale pattern, so as to generate the HDR image.

The gray-scale value of each pixel in the original gray-scale pattern is calculated by the following formula: $Y_i = 0.299 \times i_{(R)} + 0.587 \times i_{(G)} + 0.114 \times i_{(B)}$, where i is an $i^{th}$ pixel of the original image, $Y_i$ is an $i^{th}$ gray-scale value of the original gray-scale pattern, $i_{(R)}$ is a red pixel value of the $i^{th}$ pixel of the original image, $i_{(G)}$ is a green pixel value of the $i^{th}$ pixel of the original image, $i_{(B)}$ is a blue pixel value of the $i^{th}$ pixel of the original image, and i is a positive integer.

The step of performing the conversion procedure further comprises: searching the compensation values for a maximum compensation value and a minimum compensation value; and compensating the original gray-scale pattern with the gradients, the compensation values, the maximum compensation value, and the minimum compensation value, so as to obtain the high dynamic gray-scale pattern. The gradients, the compensation values, the maximum compensation value, and the minimum compensation value are respectively calculated by the following formulae:

$$H(E_i) = \sqrt{dE_i x^2 + dE_i y^2}, \quad K(i) = H(E_i) \times \left( \frac{H(E_i)}{\sum_{i=1}^{N} H(E_i)} \right)^{\alpha},$$

$$Y'_i = \beta \times \left( \frac{K(i) - 0.6 K_{min}}{0.9 K_{max} - 0.6 K_{min}} \right) + \gamma \times Y_i,$$

where N is a total number of the pixels in the original gray-scale pattern, i is the $i^{th}$ pixel in the original gray-scale pattern, $H(E_i)$ is a gradient of the $i^{th}$ pixel in the original gray-scale pattern, $dE_i x^2$ is a variable of the $i^{th}$ pixel in the original gray-scale pattern in a horizontal direction, $dE_i y^2$ is a variable of the $i^{th}$ pixel in the original gray-scale pattern in a vertical direction, $K(i)$ is a compensation value of the $i^{th}$ pixel in the original gray-scale pattern, $Y'_i$ is a gray-scale value of the $i^{th}$ pixel in the high dynamic gray-scale pattern, $Y_i$ is a gray-scale value of the $i^{th}$ pixel in the original gray-scale pattern, $K_{max}$ is the maximum compensation value, $K_{min}$ is the minimum compensation value, i and N are positive integers, and $\alpha$, $\beta$, and $\gamma$ are positive numbers.

The HDR image is generated by the following formula:

$$A'_{(R,G,B)} = \left(\frac{Y'}{Y} \times A_{(R,G,B)}\right)^\lambda,$$

where $A'_{(R)}$ is a red gray value of the HDR image, $A'_{(G)}$ is a green gray value of the HDR image, $A'_{(B)}$ is a blue gray value of the HDR image, $A_{(R)}$ is a red gray value of the original image, $A_{(G)}$ is a green gray value of the original image, $A_{(B)}$ is a blue gray value of the original image, Y' is the high dynamic gray-scale pattern, Y is the original gray-scale pattern, and $\lambda$ is a positive number.

A digital image pickup device for generating an HDR image is further provided. First, an original image is captured by the digital image pickup device, and then a gray-scale processing and image compensation are performed on the original image to generate an HDR image by using the aforementioned method of generating HDR image.

According to the method of generating HDR image and the digital image pickup device of the present invention, a gray-scale processing and image compensation are performed on an original image to generate an HDR image. Thereby, the time taken for capturing a plurality of images is shortened and the space for storing the captured images is reduced. Meanwhile, the time for synthesizing a plurality of images into a single image is reduced, and the bloom is also avoided.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 4:
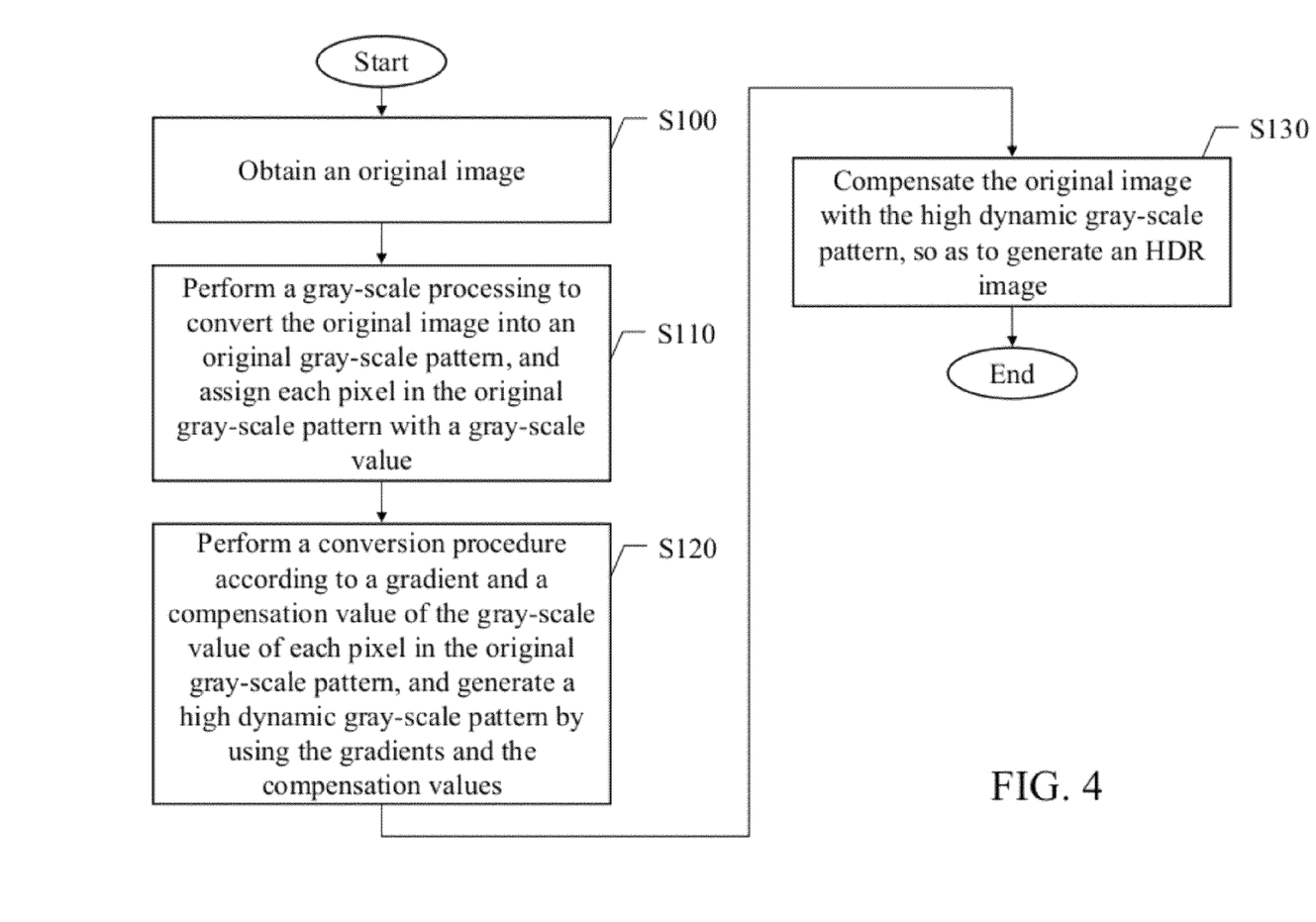
FIG. 4 is a flow chart of a method of generating HDR image according to a preferred embodiment.

FIG. 4 is a flow chart of a method of generating a high dynamic range (HDR) image according to a preferred embodiment. The method of generating HDR image is applied to a digital image pickup device for generating an HDR image according to a single digital image. The method comprises the following steps.

In step S100, an original image is obtained.

In step S110, a gray-scale processing is performed to convert the original image into an original gray-scale pattern, and each pixel in the original gray-scale pattern is assigned with a gray-scale value.

In step S120, a conversion procedure is performed according to a gradient and a compensation value of the gray-scale value of each pixel in the original gray-scale pattern, and a high dynamic gray-scale pattern is generated by using the gradients and the compensation values.

In step S130, the original image is compensated with the high dynamic gray-scale pattern, so as to generate an HDR image.

In the step S100, the original image is obtained from a storage unit of the digital image pickup device, or loaded from other storage units into the digital image pickup device.

Further, in the step S110, the gray-scale value of each pixel in the original gray-scale pattern is calculated by the following formula: $Y_i = 0.299 \times i_{(R)} + 0.587 \times i_{(G)} + 0.114 \times i_{(B)}$, where i is an $i^{th}$ pixel of the original image, $Y_i$ is an $i^{th}$ gray-scale value of the original gray-scale pattern, $i_{(R)}$ is a red pixel value of the $i^{th}$ pixel of the original image, $i_{(G)}$ is a green pixel value of the $i^{th}$ pixel of the original image, $i_{(B)}$ is a blue pixel value of the $i^{th}$ pixel of the original image, and i is a positive integer.

Figure 5:
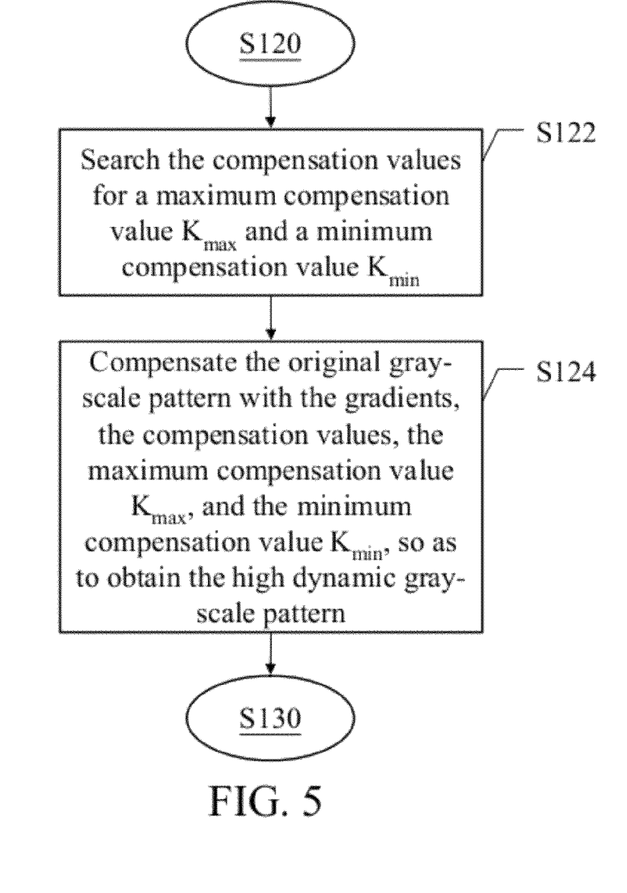
FIG. 5 is a flow chart of a conversion procedure in the method of generating HDR image according to a preferred embodiment.

FIG. 5 is a flow chart of the conversion procedure in the method of generating HDR image according to a preferred embodiment. The step of performing the conversion procedure in S120 further comprises the following sub-steps.

In step S122, the compensation values are searched for a maximum compensation value $K_{max}$ and a minimum compensation value $K_{min}$.

In step S124, the original gray-scale pattern is compensated with the gradients, the compensation values, the maximum compensation value $K_{max}$, and the minimum compensation value $K_{min}$, so as to obtain the high dynamic gray-scale pattern.

The gradients, the compensation values, the maximum compensation value, and the minimum compensation value are respectively calculated by the following formulae:

$$H(E_i) = \sqrt{dE_i x^2 + dE_i y^2}, \quad K(i) = H(E_i) \times \left(\frac{H(E_i)}{\sum_{i=1}^{N} H(E_i)}\right)^\alpha,$$

$$Y'_i = \beta \times \left(\frac{K(i) - 0.6 K_{min}}{0.9 K_{max} - 0.6 K_{min}}\right) + \gamma \times Y_i,$$

where N is a total number of the pixels in the original gray-scale pattern, i is the $i^{th}$ pixel in the original gray-scale pattern, $H(E_i)$ is a gradient of the $i^{th}$ pixel in the original gray-scale pattern, $dE_x x^2$ is a variable of the $i^{th}$ pixel in the original gray-scale pattern in a horizontal direction, $dE_y y^2$ is a variable of the $i^{th}$ pixel in the original gray-scale pattern in a vertical direction, K(i) is a compensation value of the $i^{th}$ pixel in the original gray-scale pattern, $Y'_i$ is a gray-scale value of the $i^{th}$ pixel in the high dynamic gray-scale pattern, $Y_i$ is a gray-scale value of the $i^{th}$ pixel in the original gray-scale pattern, $K_{max}$ is the maximum compensation value, $K_{min}$ is the minimum compensation value, i and N are positive integers, and $\alpha$, $\beta$, and $\gamma$ are positive numbers.

In the step S130, the HDR image is generated by the following formula:

$$A'_{(R,G,B)} = \left(\frac{Y'}{Y} \times A_{(R,G,B)}\right)^\lambda,$$

where $A'_{(R)}$ is a red gray value of the HDR image, $A'_{(G)}$ is a green gray value of the HDR image, $A'_{(B)}$ is a blue gray value of the HDR image, $A_{(R)}$ is a red gray value of the original image, $A_{(G)}$ is a green gray value of the original image, $A_{(B)}$ is a blue gray value of the original image, Y' is the high dynamic gray-scale pattern, Y is the original gray-scale pattern, and λ is a positive number.

The method of generating an HDR image of the present invention is applied to a digital image pickup device capable of capturing an image. This method can be built in a storage unit of the digital image pickup device in the form of a software or firmware program, and implemented by a processor of the digital image pickup device in the manner of executing the built-in software or firmware program while using its image capturing function. Here, the digital image pickup device may be, but not limited to, a digital camera, a computer, a mobile phone, or a personal digital assistant (PDA) capable of capturing an image.

Figure 6:
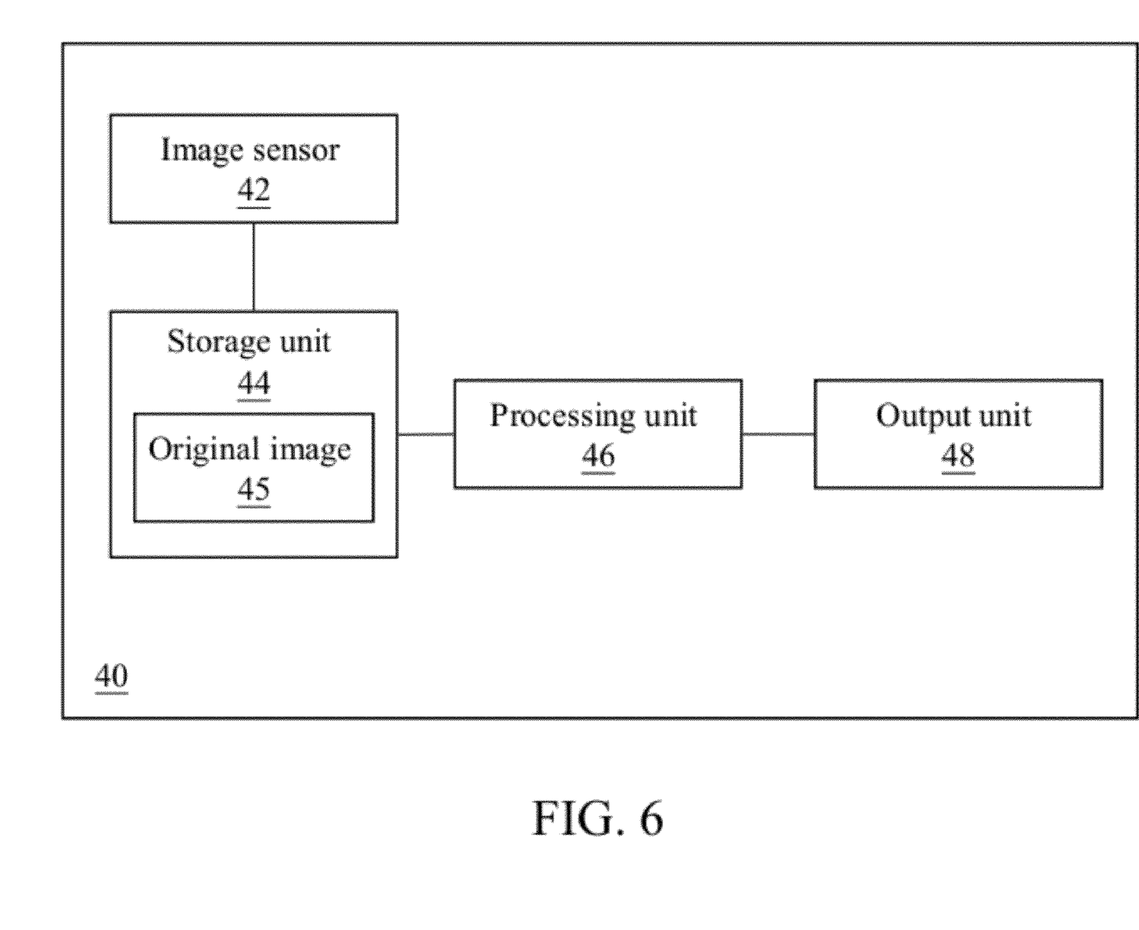
FIG. 6 is a schematic architectural view of a digital image pickup device for generating an HDR image according to a preferred embodiment.

FIG. 6 is a schematic architectural view of a digital image pickup device for generating an HDR image according to a preferred embodiment. Through the method of generating HDR image, the digital image pickup device 40 performs a gray-scale processing and image compensation on an original image to generate an HDR image. The digital image pickup device 40 comprises an image sensor 42, a storage unit 44, a processing unit 46, and an output unit 48.

The image sensor 42 converts a captured digital image into an original image 45. The storage unit 44 is connected to the image sensor 42, for storing the original image 45. The processing unit 46 is connected to the storage unit 44, for performing the method of generating HDR image to generate an HDR image. The output unit 48 is connected to the processing unit 46, for displaying the generated HDR image on a screen of the digital image pickup device 40.

The image sensor 42 is a complementary metal-oxide semiconductor (CMOS) sensor or a charge coupled device (CCD) sensor.

The storage unit 44 is a random access memory (RAM), a dynamic random access memory (DRAM), or a synchronous dynamic random access memory (SDRAM).

According to the method of generating HDR image and the digital image pickup device of the present invention, a gray-scale processing and image compensation are performed on an original image to generate an HDR image. Thereby, the time taken for capturing a plurality of images is shortened and the space for storing the captured images is reduced. Meanwhile, the time for synthesizing a plurality of images into a single image is reduced, and the bloom is also avoided.

What is claimed is:

1. A method of generating a high dynamic range (HDR) image, applicable to a digital image pickup device for generating an HDR image according to a single digital image, the method comprising:

obtaining an original image;

performing a gray-scale processing to convert the original image into an original gray-scale pattern, wherein each pixel in the original gray-scale pattern is assigned with a gray-scale value;

performing a conversion procedure according to a gradient and a compensation value of the gray-scale value of each pixel in the original gray-scale pattern, and generating a high dynamic gray-scale pattern by using the gradients and the compensation values, comprising:

searching the compensation values for a maximum compensation value and a minimum compensation value; and compensating the original gray-scale pattern with the gradients, the compensation values, the maximum compensation value, and the minimum compensation value, so as to obtain the high dynamic gray-scale pattern, and the gradients, the compensation values, the maximum compensation value, and the minimum compensation value are respectively calculated by the following formulae:

$$H(E_i) = \sqrt{dE_i x^2 + dE_i y^2},$$

$$K(i) = H(E_i) \times \left(\frac{H(E_i)}{\sum_{i=1}^{N} H(E_i)}\right)^{\alpha}, \text{ and}$$

$$Y'_i = \beta \times \left(\frac{K(i) - 0.6 K_{min}}{0.9 K_{max} - 0.6 K_{min}}\right) + \gamma \times Y_i,$$

where N is a total number of the pixels in the original gray-scale pattern, i is the $i^{th}$ pixel in the original gray-scale pattern, $H(E_i)$ is a gradient of the $i^{th}$ pixel in the original gray-scale pattern, $dE_i x^2$ is a variable of the $i^{th}$ pixel in the original gray-scale pattern in a horizontal direction, $dE_i y^2$ is a variable of the $i^{th}$ pixel in the original gray-scale pattern in a vertical direction, K(i) is a compensation value of the $i^{th}$ pixel in the original gray-scale pattern, $Y'_i$ is a gray-scale value of the $i^{th}$ pixel in the high dynamic gray-scale pattern, $Y_i$ is a gray-scale value of the $i^{th}$ pixel in the original gray-scale pattern, $K_{max}$ is the maximum compensation value, $K_{min}$ is the minimum compensation value, i and N are positive integers, and α, β, and γ are positive numbers; and compensating the original image with the high dynamic gray-scale pattern, so as to generate an HDR image.

2. A digital image pickup device for generating a high dynamic range (HDR) image, applied to generate an HDR image according to a single digital image, the device comprising:

an image sensor, for converting a captured digital image into an original image;

a storage unit, connected to the image sensor, for storing the original image; and a processing unit, connected to the storage unit, for performing the method of generating an HDR image according to claim 1, so as to generate an HDR image.

3. The digital image pickup device for generating an HDR image according to claim 2, wherein the image sensor is a complementary metal-oxide semiconductor (CMOS) sensor or a charge coupled device (CCD) sensor.

4. The digital image pickup device for generating an HDR image according to claim 2, wherein the storage unit is a random access memory (RAM), a dynamic random access memory (DRAM), or a synchronous dynamic random access memory (SDRAM).

5. A method of generating a high dynamic range (HDR) image, applicable to a digital image pickup device for generating an HDR image according to a single digital image, the method comprising:

obtaining an original image;

performing a gray-scale processing to convert the original image into an original gray-scale pattern, wherein each pixel in the original gray-scale pattern is assigned with a gray-scale value;

performing a conversion procedure according to a gradient and a compensation value of the gray-scale value of each pixel in the original gray-scale pattern, and generating a high dynamic gray-scale pattern by using the gradients and the compensation values; and compensating the original image with the high dynamic gray-scale pattern, so as to generate an HDR image, wherein the gray-scale value of each pixel in the original gray-scale pattern is calculated by the following formula:

$$Y_i = 0.299 \times i_{(R)} + 0.587 \times i_{(G)} + 0.114 \times i_{(B)}$$

where i is an $i^{th}$ pixel of the original image, $Y_i$ is an $i^{th}$ gray-scale value of the original gray-scale pattern, $i_{(R)}$ is a red pixel value of the $i^{th}$ pixel of the original image, $i_{(G)}$ is a green pixel value of the $i^{th}$ pixel of the original image, $i_{(B)}$ is a blue pixel value of the $i^{th}$ pixel of the original image, and i is a positive integer.

6. A method of generating a high dynamic range (HDR) image, applicable to a digital image pickup device for generating an HDR image according to a single digital iamge, the method comprising:

obtaining an original image;

performing a gray-scale processing to convert the original image into an original gray-scale pattern, wherein each pixel in the original gray-scale pattern is assigned with a gray-scale value;

performing a conversion procedure according to a gradient and a compensation value of the gray-scale value of each pixel in the original gray-scale pattern, and generating a high dynamic gray-scale pattern by using the gradients and the compensation values; and compensating the original image with the high dynamic gray-scale pattern, so as to generate an HDR image, wherein the HDR image is generated by the following formula:

$$A'_{(R,G,B)} = \left(\frac{Y'}{Y} \times A_{(R,G,B)}\right)^\lambda$$

where $A'_{(R)}$ is a red gray value of the HDR image, $A'_{(G)}$ is a green gray value of the HDR image, $A'_{(B)}$ is a blue gray value of the HDR image, $A_{(R)}$ is a red gray value of the original image, $A_{(G)}$ is a green gray value of the original image, $A_{(B)}$ is a blue gray value of the original image, Y' is the high dynamic gray-scale pattern, Y is the original gray-scale pattern, and $\lambda$ is a positive number.

* * * * *